United States Patent [19]

Haese et al.

[11] Patent Number: 4,915,473
[45] Date of Patent: Apr. 10, 1990

[54] PRESSURE SENSOR UTILIZING A POLYURETHANE OPTICAL FIBER

[75] Inventors: Nathan N. Haese, Walnut Creek; David R. Pedersen, Clayton, both of Calif.

[73] Assignee: The Dow Chemical Company, Midland, Mich.

[21] Appl. No.: 314,685

[22] Filed: Feb. 23, 1989

[51] Int. Cl.⁴ .................... G02B 6/00; H01J 5/16; G01D 5/34; B32B 27/00
[52] U.S. Cl. .................... 350/96.29; 350/96.34; 250/227.14; 250/231.19; 73/655; 73/800; 428/160; 428/423.1
[58] Field of Search ........... 350/96.10, 96.29, 96.32, 350/96.30, 96.34; 250/227, 231 P; 73/655, 800; 428/160, 158, 423.1; 264/1.5, 1.6

[56] References Cited

U.S. PATENT DOCUMENTS

| | | | |
|---|---|---|---|
| 4,078,432 | 3/1978 | Stewart | 250/227 X |
| 4,387,954 | 6/1983 | Beasley | 350/96.15 |
| 4,519,252 | 5/1985 | McMahon | 73/655 |
| 4,552,431 | 11/1985 | Allemand et al. | 350/96.34 |
| 4,690,501 | 9/1987 | Zimmerman et al. | 350/96.29 |
| 4,701,614 | 10/1987 | Jaeger et al. | 350/96.29 |
| 4,703,757 | 11/1987 | Cohen | 128/667 |
| 4,708,833 | 11/1987 | Ohsawa et al. | 264/1.5 |
| 4,750,796 | 6/1988 | Shibata et al. | 350/96.29 |
| 4,757,195 | 7/1988 | Katagiri et al. | 250/231 P |
| 4,826,284 | 5/1989 | Sakagami et al. | 350/96.34 |
| 4,830,461 | 5/1989 | Ishiharada et al. | 350/96.29 |
| 4,836,646 | 6/1989 | Parker et al. | 350/96.34 |

FOREIGN PATENT DOCUMENTS 2145841 4/1985 United Kingdom ........ 350/96.29 X

OTHER PUBLICATIONS

"Fiber Optics," Kirk–Othmer: Encyclopedia of Chemical Technology, 3rd edition, vol. 10, John Wiley & Sons, New York, 1980, pp. 125–147.
"Fibers, Optical", Encyclopedia of Polymer Science and Engineering, vol. 7, John Wiley & Sons, New York, 1986, pp. 1–15.
"Silicones," Kirk–Othmer: Encyclopedia of Chemical Technology, 3rd edition, vol. 20, John Wiley & Sons, New York, 1982, pp. 922–962.
"Urethane Polymers," Kirk–Othmer: Encyclopedia of Chemical Technology, 3rd edition, vol. 23, John Wiley & Sons, New York, 1983, pp. 576–607.
EoTec Corporation, Product Brochure on Fiber Optic Sensors, pp. 2–5.
Lagakos et al., "Planar flexible fiber-optic . . . sensor" Optics Lett. vol. 13, No. 9 9/88 pp. 788–790.

Primary Examiner—William L. Sikes
Assistant Examiner—Brian M. Healy

[57] ABSTRACT

The invention is a pressure sensing device utilizing a polymer optical fiber with a core comprised of a flexible thermoplastic aliphatic segmented polyurethane. The use of an optical fiber based pressure sensor eliminates the electromagnetic interference problems associated with conventional electronic pressure sensors. Use of polyurethane as the core material for the optical fiber results in an optical fiber with high flexibility, thus making the inventive pressure sensing device more rugged and durable than other optical fiber based pressure sensors.

19 Claims, 8 Drawing Sheets

PRESSURE SENSOR UTILIZING A POLYURETHANE OPTICAL FIBER

BACKGROUND OF THE INVENTION

This invention relates to a novel pressure sensing device. In particular, this invention relates to a pressure sensing device utilizing a polymer optical fiber with a core comprised of a flexible thermoplastic aliphatic segmented polyurethane.

Conventional electronic pressure sensors suffer from electromagnetic pickup interference. The use of optical fiber based pressure sensors eliminates the problem of electromagnetic interference. However, present optical fibers are primarily fabricated from glass or hard glassy polymers such as acrylics and styrenics. Such optical fibers possess low flexibility and low strength. Such polymer optical fibers also sometimes possess low use temperatures. These limitations of the present optical fibers result in optical fiber based pressure sensors which are easily damaged.

What is needed is a durable pressure sensor which is immune to electromagnetic inerference.

SUMMARY OF THE INVENTION

The invention is an optical fiber pressure sensing device comprising:
(A) a light source capable of transmitting light through the optical fiber(s);
(B) a means of transmitting light from the light source to the pressure sensing component;
(C) a pressure sensing component comprising:
   (i) at least one optionally unclad optical fiber in which the core is comprised of a flexible thermoplastic aliphatic segmented polyurethane through which light from the light source is transmitted, and
   (ii) a means of compressing the optical fiber(s) such that when the optical fiber(s) is compressed under pressure, the intensity of light passing through the optical fiber(s) varies inversely with the pressure applied without deleteriously affecting the physical integrity of the optical fiber(s);
(D) a means of transmitting light from the pressure sensing component to the light detector;
(E) a light detector capable of measuring the intensity of light transmitted through the optical fiber(s); and
(F) optionally an informational handling system capable of recording the light intensity signal received from the light detector.

The optical fibers useful in this invention are flexible. The inventive pressure sensing device utilizing such polymer optical fibers is therefore durable and immune to electromagnetic interference.

DETAILED DESCRIPTION OF THE INVENTION

The invention is an optical fiber based pressure sensor utilizing a polymer optical fiber comprising a core of a flexible thermoplastic aliphatic segmented polyurethane which is capable of transmitting light.

Figure 1:
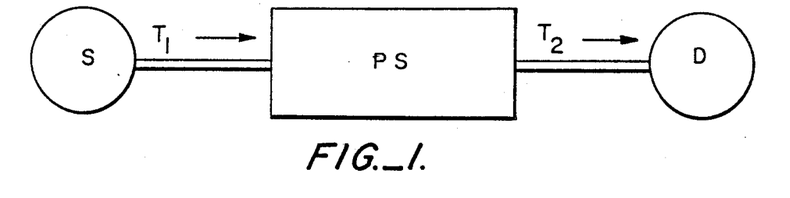
FIGS. 1 and 2 illustrate schematic representations of the pressure sensor of this invention.
Figure 2:
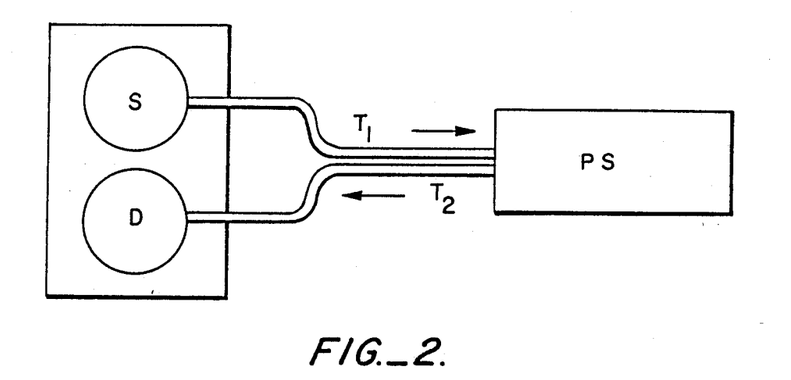
Figure 3:
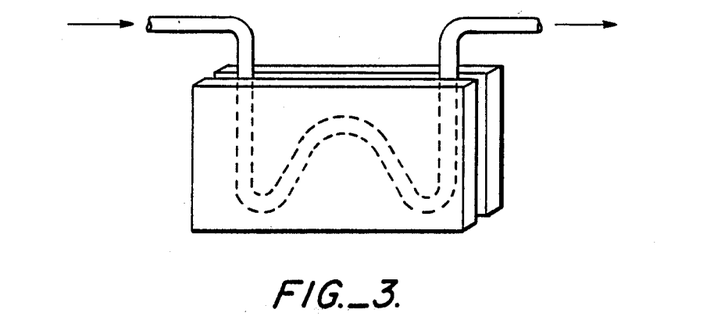
FIG. 3 illustrates the deployment of a single fiber between the compressive means.
Figure 4:
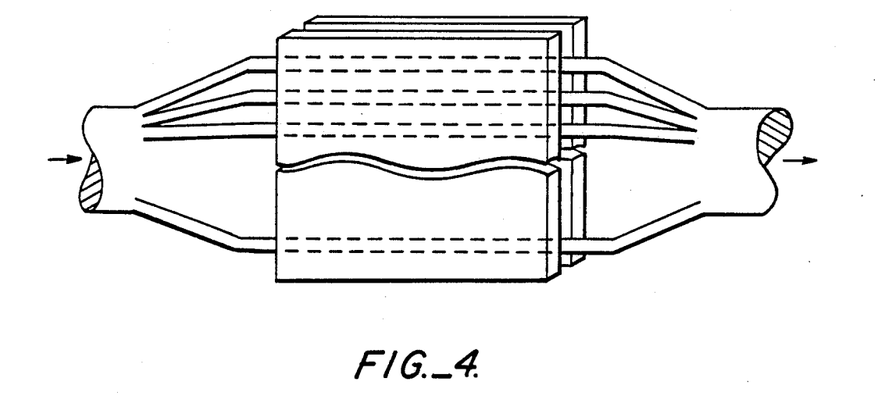
FIG. 4 illustrates the deployment of multiple fibers between the compressive means.

In FIGS. 1 and 2, S represents the light source. D represents the light detector and optional informational handling system. $T_1$ represents the means of transmitting light from the light source to the pressure sensing component PS which comprises the optical fiber(s) and the compressive means. $T_2$ represents the means of transmitting light from the pressure sensing component PS to the light detector and optional informational handling system D. Within the pressure sensing component, single or multiple optical fibers may be deployed between the compressive means as illustrated by FIGS. 3 and 4.

The light source may be any source capable of transmitting light through the optical fiber(s) over wavelengths of from about 400 to about 900 nanometers. The light source may be monochromatic or polychromatic. For example, the light source may be a visible region tungsten bulb, a light emitting diode, a gaseous laser, or other light source. See Kist, "Sources and Detectors for Fiber-optic Systems," *Optical Fiber Sensors*, Martinus Nijhoff Publishers, 1987, pp. 267–298, incorporated herein by reference. The light from the light source may optionally be passed through a focussing means before being transmitted to the optical fiber(s).

The means of transmitting light from the light source to the pressure sensing component preferably comprises an optical fiber possessing an attenuation of less than about 20 decibels/meter. Such an optical fiber may be fabricated from glass or polymers. More preferably, the means of transmitting light from the light source to the pressure sensing component comprises the flexible thermoplastic aliphatic segmented polyurethane core fiber utilized in the pressure sensing component.

The optical fibers useful in the pressure sensing component possess cores fabricated from flexible thermoplastic aliphatic segmented polyurethanes. Polyurethanes preferred for use in this invention are formed by the reaction of a glycol, a diisocyanate, and a chain extender as described in Collins, U.S. Pat. No. 4,621,113, incorporated herein by reference. Such polyurethanes preferably comprise alternating soft and hard segments, (1) said soft segments being derivable from the rection of
   (a) generally linear molecules terminated at each end by an isocyanate group and consisting of
      (i) n residues of one or more methylolterminated polyetherglycols having molecular weights of from about 1000 to about 6000 and consisting essentially of chains of $-O-CRR^1-CH_2-$ units in which each of R and $R^1$ is hydrogen, methyl, or ethyl independently, except that in at least a preponderance of said units one or the other of R and $R^1$ is not hydrogen, and
      (ii) (n+1) residues of one or more nonaromatic diisocyanates, joined to said polyetherglycol residues by intervening carbamate groups, n ranging from 1 to about 4 and having an average value of from about 1.5 to about 1, and
(2) said hard segments being derivable from the reaction of a chain extender with the isocyanate end groups in said molecules and with one or more non-aromatic non-polymeric diisocyanates of a nature such that the resulting carbamate groups will be unable to associate with each other in such a manner as to result in domain crystallinity in the resulting polymer.

Preferred glycols used to form the polyurethanes useful in this invention are predominantly derivable from branched $C_{3-6}$ alkylene oxides, more preferably propylene oxide and/or butylene oxide. Some ethylene oxide derivable units may be included, so long as the essential effect of branched units on the character of the pre- and final polymers is retained and phase crystallization does not occur. The amount of ethylene oxide units to branched alkylene oxide units is preferably less than about 20 weight percent. Glycols especially preferred for use in this invention include poly(oxypropyleneoxyethylene)glycol, for example, VORANOL ® 5287 diol ( ® trademark of The Dow Chemical Company), and poly(oxybutyleneoxyethylene)glycol.

Preferably the diisocyanates useful in this invention comprise no aromatic moieties and comprise only aliphatic and/or cycloaliphatic moieties Preferred diisocyanates include polymethylene diisocyanates, 1,4-bis-(isocyanatomethyl)cyclohexane, cyclohexane-1,4-diisocyanate, 2,2,4-trimethylhexamethylene diisocyanate, di(isocyanatoethyl)carbonate, lysine diisocyanate, isophorone diisocyanate, 1,8 diisocyanato-p-methane, 1,6-diisocyanato-2,2,4,4 tetramethylhexane, 1,6-diisocyanato-2,4,4 trimethylhexane, menthylene bis(4-cyclohexylisocyanate), isopropylidene bis(4-isocyanatocyclohexane), 1,4-dimethylene isocyanatocyclohexane, and 1,3-dimethylene isocyanatocyclohexane.

Preferred chain extenders include aliphatic $C_{2-4}$ straight chain and branched chain diols, diamines, and hydroxyamines; hydrazine and piperazine; cyclo- and dicycloaliphatic diols, diamines, or hydroxyamines having up to 12 carbon atoms, hydroquinone and resorcinol—as such or as the bis(2-hydroxyethyl)ethers, and aromatic and heterogenous nuclei—as such or hydrogenated, and substituted with two groups which are methylol and/or aminomethyl. More preferred chain extenders are aliphatic straight and branched chain $C_{2-4}$ diols. Higher functionality hydroxy and/or amino compounds considered suitable chain extenders include pentaerythritol, trimethylolpropane and N(-2-hydroxypropyl)ethylenediamine. Other suitable types of chain extenders include fluorine-substituted, difunctional active hydrogen compounds, for example, 1,2,3,3,4,4-hexafluoropentane-1,5 diol and phenyl substituted $C_{2-5}$ diols, preferably 2-phenyl-1,3-propylene glycol or phenyl-1,4-butylene glycol.

The mole ratio of glycol:diisocyanate:chain extender is preferably in the range from about 1:3:2 to about 1:15:14, more preferably from about 1:4:3 to about 1:6:5. The weight average molecular weight of said polyurethanes is preferably in the range of about 100,000 to about 200,000. The polyurethanes useful in this invention preferably possess a Shore hardness as measured by ASTM D2240-86 of between about A45 and about D80. The refractive index of said polyurethanes is preferably between about 1.45 and about 1.55.

The polymer optical fiber polyurethane core is preferably clad with a flexible material which adheres to the core and which possesses a lower refractive index than the thermoplastic aliphatic segmented polyurethane core. The clad material preferably possesses a refractive index which is at least 0.01 units less than the refractive index of the core. A preferred class of clad materials includes the polysiloxanes. Polysiloxanes are well known in the art. See *Kirk-Othmer Encyclopedia of Chemical Technology*, 3rd ed., Vol. 20, John Wiley & Sons, New York, N.Y., 1982, pp. 922–962, incorporated herein by reference. Especially preferred polysiloxanes for use in this invention are ultraviolet (UV) curable siloxanes available from Dow Corning Corporation under the designations DC-6256-100 and X3-67365.

The polymeric optical fibers useful in this invention may be made by methods known in the art. One process involves forming the core and clad in a preform which is thereafter heated to a temperature at which the core and clad may be drawn down to an appropriate size for the polymer optical fiber. In another process, the core is extruded and then the clad may be coated on the core and thereafter cured in place. The use of cup-coating techniques may generally be used and any curing mechanism which adequately cures the clad to the core is suitable, for example, heat cure or ultraviolet (UV) cure. In still another process, the optical fibers may be formed by a co-extrusion process in which the core and clad are simultaneously extruded to form the desired shape. In the co-extrusion process, the core material and the clad material are separately heated to a temperature suitable for extrusion and the materials are thereafter extruded. The molten core and clad materials are brought together in a die. The materials are then passed through the die. The extrusion temperature is dependent upon the particular core and clad materials and the temperature used must be suitable for both materials. During co-extrusion, it is important to match the viscosity of the materials, such that under temperature and shear conditions the viscosity of the clad is equal to or less than the viscosity of the core.

In a preferred process, the core is first extruded and the clad is then coated onto the core and cured in place. The flexible thermoplastic aliphatic segmented polyurethane polymer used for the core is preferably dried prior to extrusion. The polyurethane is then heated to a temperature to form a melt suitable for extrusion. For the polyurethanes useful in this invention, the extrusion temperature is preferably between about 150° C. and about 200° C., more preferably between about 160° C. and 190° C. The polyurethane melt is preferably filtered prior to extrusion in order to remove particles greater than about 10 microns, more preferably of greater than about 2 microns. The polyurethane is extruded through a fiber die. The extrudate is cooled and drawn down to the desired size. The extrudate is drawn down to produce a fiber possessing a diameter of between about 0.1 millimeters and 2.0 millimeters, more preferably between about 0.5 millimeters and about 1.0 millimeters.

The clad material is then coated onto the polyurethane core by dipping, cup-coating, spraying, or other conventional techniques. A thin coating of the clad material is thus deposited on the core surface. The coating is thereafter cured by heating or UV radiation. Where the preferred clad material is polysiloxane, the clad is usually UV cured. The thickness of the clad is preferably between about 1 and about 100 microns, more preferably between about 5 and about 25 microns.

The maximum use temperature of said optical fibers is preferably about 60° C. or greater, more preferably about 80° C. or greater. The attenuation, i.e. light loss, of the fibers at about 400 to about 900 nanometers is preferably less than about 30 decibels/meter, more preferably less than about 25 decibels/meter.

The optical fibers used in this invention preferably have a total diameter in the range from about 0.1 to about 2.0 millimeters. A single fiber may be utilized in the pressure sensing device. Alternately, multiple fibers arranged in bundles or in ribbon or tape n×n arrays wherein n is an integer of one or greater, may be used.

The optical fiber(s) is placed between compressive means such that when the optical fiber(s) is compressed, the intensity of light passing through the optical fiber(s) varies inversely with the pressure applied without deleteriously affecting the physical integrity of the fiber(s). The change in light intensity is believed to be due to the change in diameter compression of the optical fiber(s) under pressure, which results in a change in the contact area between the optical fiber(s) and the compression means. The compressive means preferably comprises a surface or surfaces surrounding the optical fiber(s) which are harder than the optical fiber(s). An example of suitable compressive means includes two parallel metal, plastic, or glass plates.

The means of transmitting light from the pressure sensing component to the light detector preferably comprises an optical fiber possessing an attenuation of less than about 20 decibels/meter. Such an optical fiber may be fabricated from glass or polymers. More preferably, the means of transmitting light from the pressure sensing component to the light detector comprises the flexible thermoplastic aliphatic polyurethane core fiber utilized in the pressure sensing component.

The light transmitted through the optical fiber(s) is measured by a light detector. Any detector capable of measuring the transmitted light is suitable. Examples of preferred detectors include a silicon PIN detector with transimpedance amplifier or other semiconducting diode detector or a photomultiplier tube. A suitable informational handling system, such as a voltmeter, oscilloscope, strip chart recorder, or computer is attached to the light detector to record the light intensity signal received from the light detector.

The optical fiber pressure sensor is capable of measuring pressures which result in a fiber load of about 0.5 pounds/inch of fiber or less. The pressure sensor is calibrated for a particular use temperature.

SPECIFIC EMBODIMENT

The example is for purposes of illustration only and is not intended to limit the scope of the invention or Claims in any way.

EXAMPLE 1

Optical fibers are fabricated by extruding a core from a polyurethane of mole composition 1:6:5 VORANOL® 5287 diol:hydrogenated methylene diisocyanate: 1,4-butanol at about 180° C. The core is dip coated with a UV curable polysiloxane obtainable from Dow Corning Corporation under the product designation Grade DC-6256-100. The fiber diameter is about 0.75 mm. The fiber attenuation is about 20 decibels/meter at about 633 nanometers.

Figure 5:
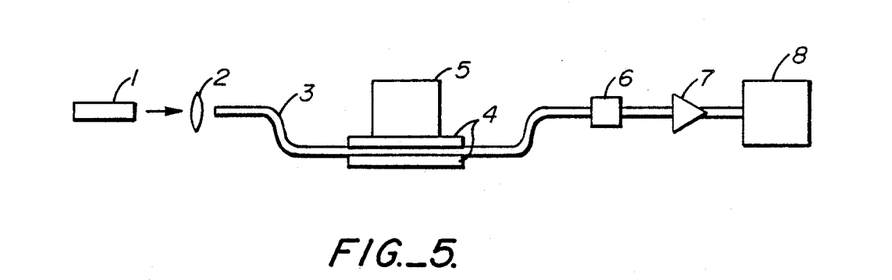
FIG. 5 illustrates the experimental pressure sensor layout of Example 1.

The experimental set-up is illustrated in FIG. 5. The optical fiber(3) is placed between two horizontal aluminum plates(4). A 5 mW HeNe laser(1) beam is focussed onto one end of the fiber with a 10× microscope objective(2). At the fiber's other end, a silicon PIN detector(6) with transimpedance amplifier (7) and chart recorder (8) is used to detect beam is focussed onto one end of the fiber with a 10× microscope objective(2). At the fiber's other end, a silicon PIN detector(6) with transimpedance amplifier(7) and chart recorder(8) is ued to detect the intensity of light transmitted through the fiber. Weights(5) of various magnitudes are placed on the horizontal plates and the intensity of the transmitted light measured.

Data for two different fiber lengths is shown in Table I. The data indicate a power decrease with added weight. The response is fairly linear up to about 2 pounds added weight, corresponding to a linear load density of about 0.2 pounds/inch of fiber.

Figure 6:
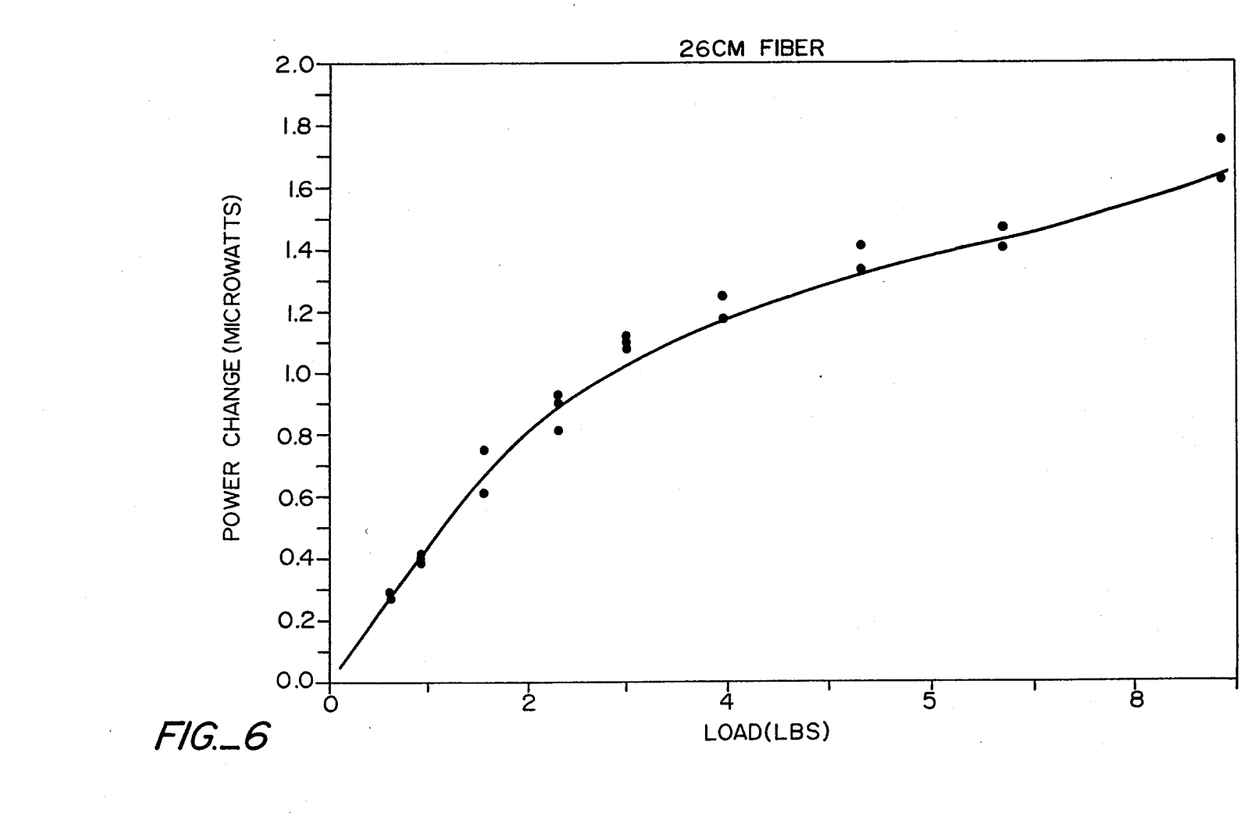
FIGS. 6-11 illustrate data on power change, load, and diameter compression obtained with the pressure sensor of Example 1.
Figure 7:
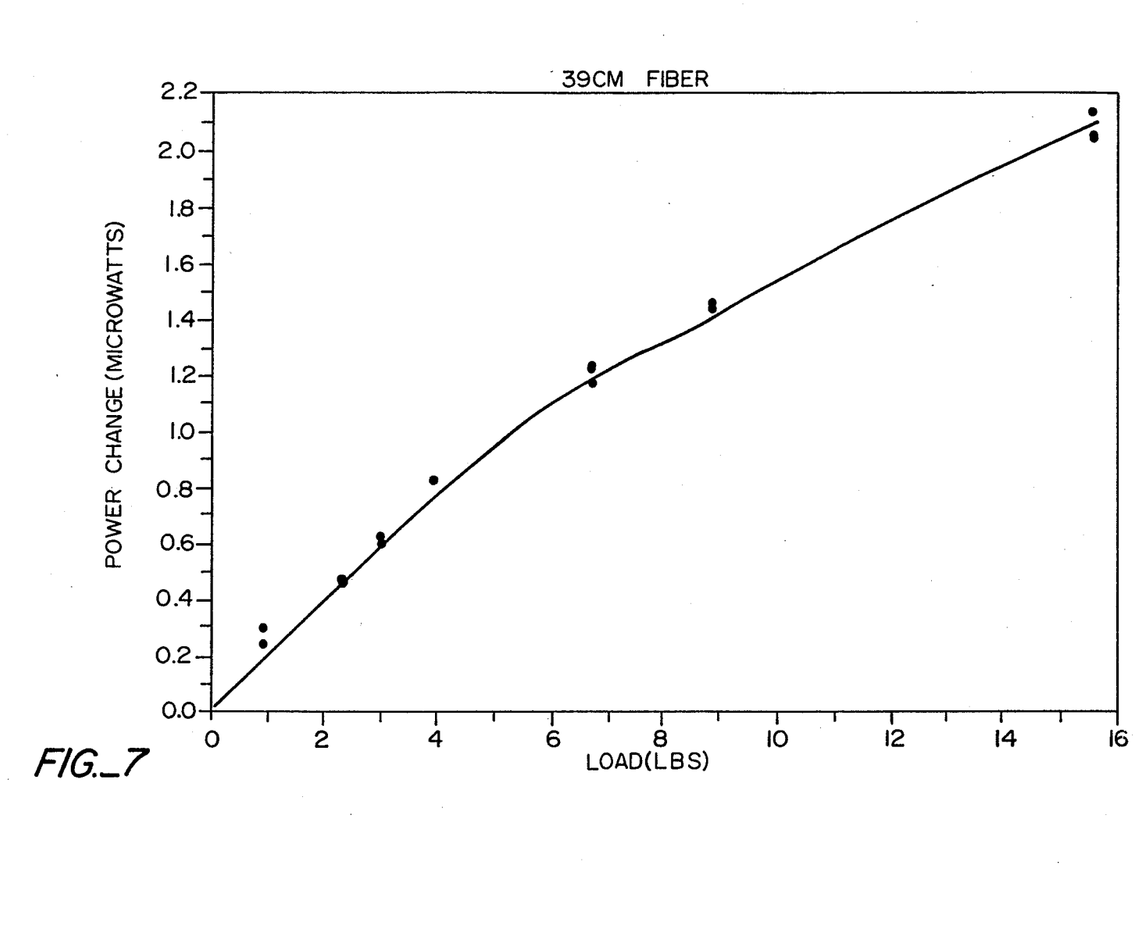
Figure 8:
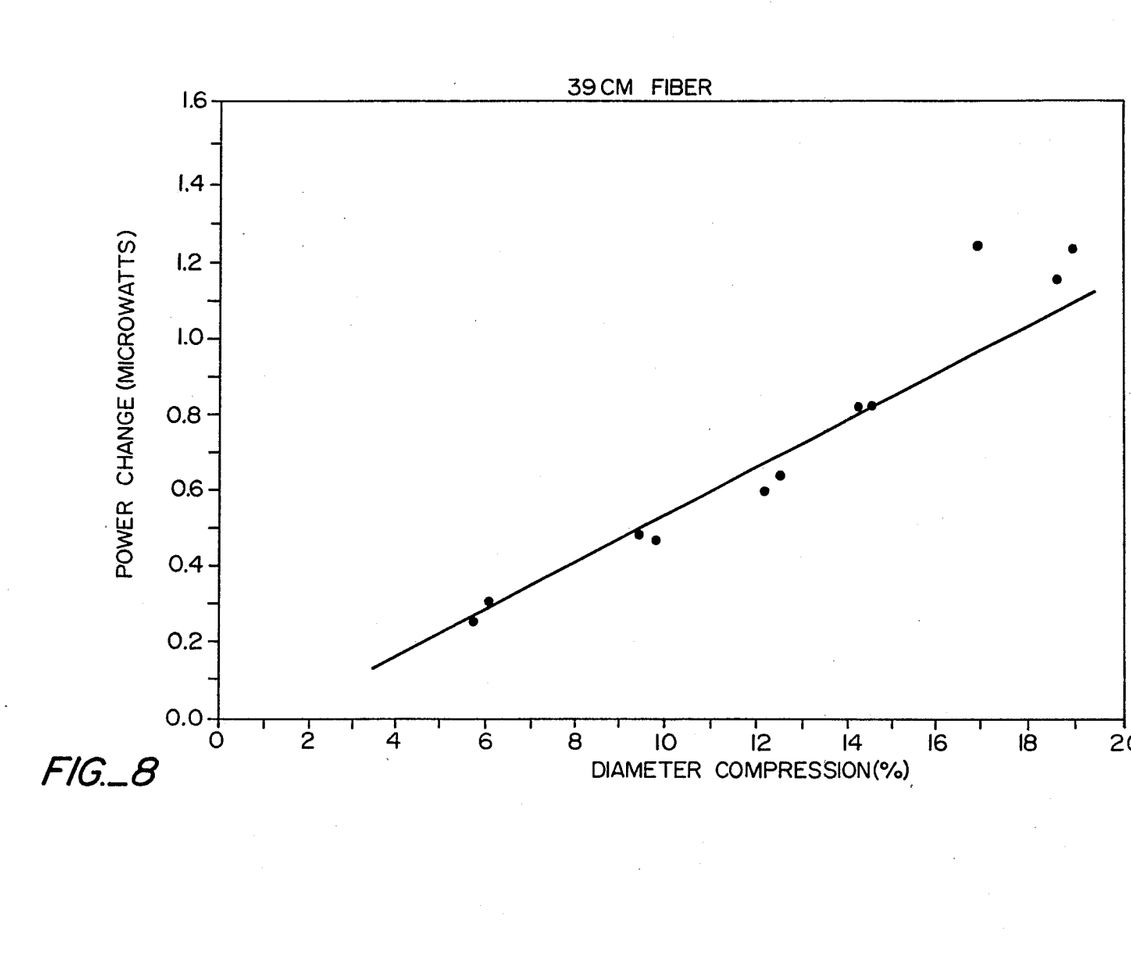
Figure 9:
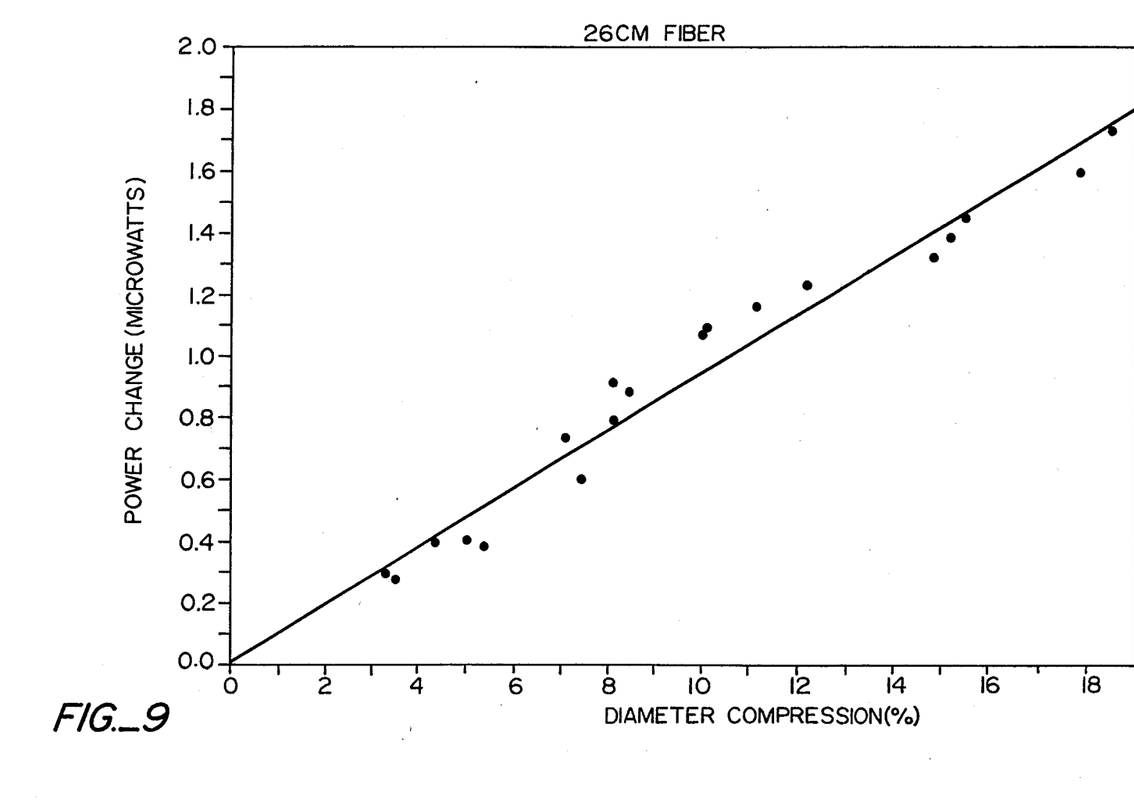
Figure 10:
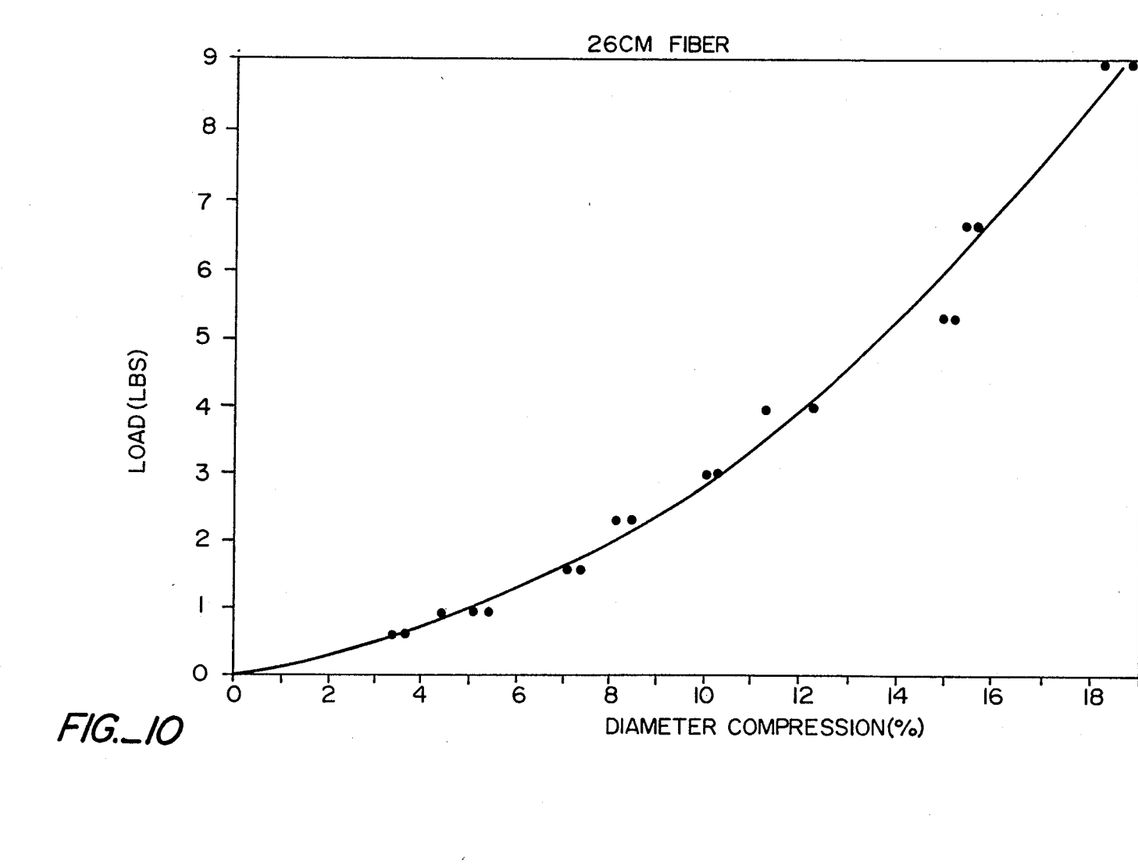
Figure 11:
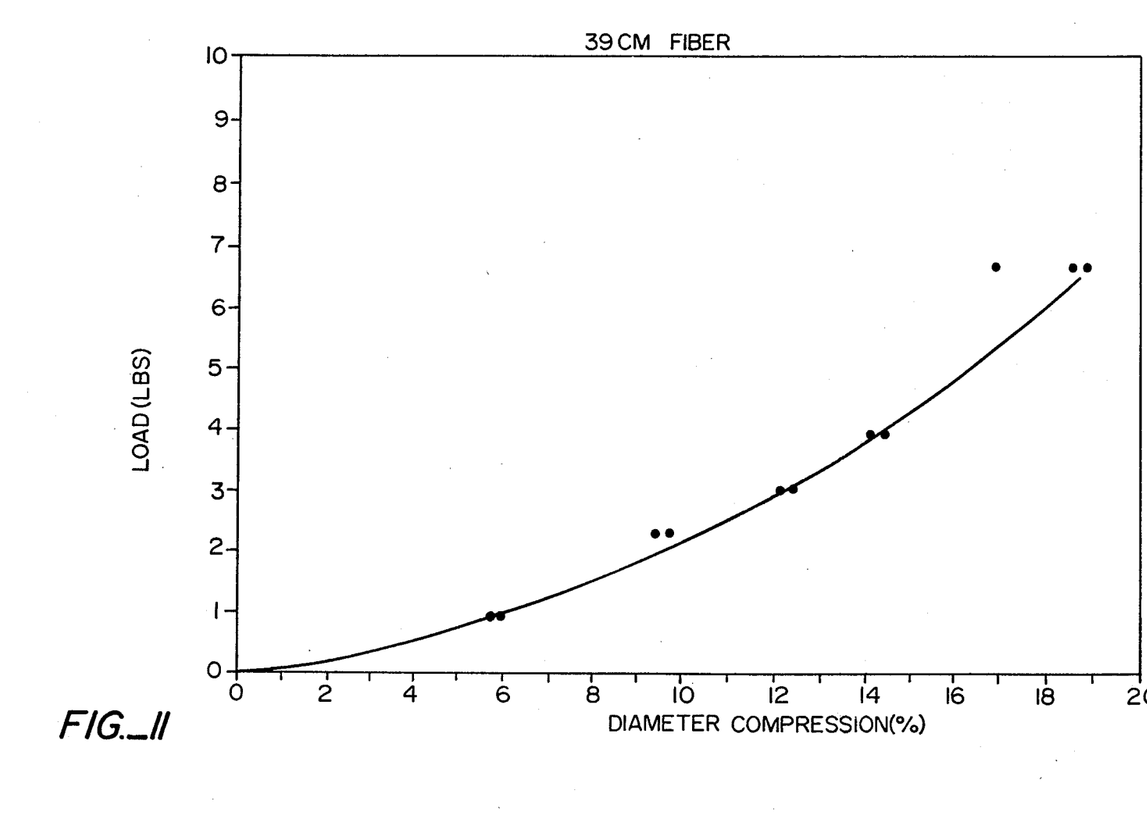

FIGS. 6 and 7 illustrate plots of the power change in microwatts (υω) versus load (pounds) for the 26 centimeter and 39 centimeter optical fiber pressure sensors, respectively. FIGS. 8 and 9 illustrate plots of load (pounds) versus diameter compression (%) for pressure sensors containing 26 centimeters and 39 centimters of optical fiber. FIGS. 10 and 11 illustrate plots of power change (υω) versus diameter compression (%) for pressure sensors utilizing 26 centimeter and 39 centimeter lengths of optical fibers.

TABLE 1

| | SENSOR DATA | |
|---|---|---|
| Weight (lbs) | Power Change (u Watts) | Compression (0.001 in.) |
| (Fiber length of 26 cm.) | | |
| 0.619 | 0.29 | 1.0 |
| 0.619 | 0.27 | 1.1 |
| 0.944 | 0.41 | 1.5 |
| 0.944 | 0.40 | 1.3 |
| 0.944 | 0.39 | 1.6 |
| 1.563 | 0.61 | 2.2 |
| 1.563 | 0.75 | 2.1 |
| 2.32 | 0.93 | 2.4 |
| 2.32 | 0.93 | 2.4 |
| 3.02 | 1.12 | 3.0 |
| 3.02 | 1.08 | 3.0 |
| 3.02 | 1.07 | — |
| 3.964 | 1.25 | 3.6 |
| 3.964 | 1.18 | 3.3 |
| 5.34 | 1.34 | 4.4 |
| 5.34 | 1.41 | 4.5 |
| 6.72 | 1.47 | 4.6 |
| 6.72 | 1.40 | 4.5 |
| 2.32 | 0.90 | 2.5 |
| 2.32 | 0.81 | 2.4 |
| 8.88 | 1.62 | 5.3 |
| 8.88 | 1.75 | 5.5 |
| (Fiber length of 39 cm.) | | |
| 0.944 | 0.31 | 1.8 |
| 0.944 | 0.25 | 1.7 |
| 3.02 | 0.64 | 3.7 |
| 3.02 | 0.60 | 3.6 |
| 6.72 | 1.24 | 5.6 |
| 6.72 | 1.25 | 5.0 |
| 6.72 | 1.16 | 5.5 |
| 2.32 | 0.48 | 2.8 |
| 2.32 | 0.47 | 2.9 |
| 3.964 | 0.83 | 4.3 |
| 3.96 | 0.83 | 4.2 |
| 8.88 | 1.45 | 6.8 |
| 8.88 | 1.47 | 6.4 |

What is claimed is:
1. An optical fiber pressure sensing device comprising:
  (A) a light source capable of transmitting light through the optical fiber(s);
  (B) a means of transmitting light from the light source to the pressure sensing component;
  (C) a pressure sensing component comprising:
    (i) at least one unclad optical fiber in which the core is comprised of a flexible thermoplastic aliphatic segmented polyurethane through which light from the light souce is transmitted, and (ii) a means of compressing the optical fiber(s) such that when the optical fiber(s) is compressed under pressure, the intensity of light passing through the optical fiber(s) varies inversely with the pressure applied without deleteriously affecting the physical integrity of the optical fiber(s);

(D) a means of transmitting light from the pressure sensing component to the light detector; and (E) a light detector capable of measuring the intensity of light transmitted through the optical fiber(s).

2. The pressure sensing device of claim 1 wherein the optical fiber is further comprised of a clad surrounding the core comprising a flexible material which adheres to the core and which possesses a lower refractive index than the flexible thermoplastic aliphatic segmented polyurethane core.

3. The pressure sensing device of claim 2 wherein the means of transmitting light from the light source to the pressure sensing component and the means of transmitting light from the pressure sensing component to the light detector comprise the flexible thermoplastic aliphatic segmented polyurethane core fiber utilized in the pressure sensing component.

4. The optical fiber pressure sensing device of claim 3 wherein the polyurethane comprises alternating soft and hard segments, (1) said soft segments being derivable from the reaction of (a) generally linear molecules terminated at each end by an isocyanate group and consisting of (i) n residues of one or more methylolterminated polyetherglycols having molecular weights of from about 1000 to about 6000 and consisting essentially of chains of —O—$CRR^1$—$CH_2$— units in which each of R and $R^1$ is hydrogen, methyl, or ethyl independently, except that in at least a preponderance of said units one or the other of R and $R^1$ is not hydrogen, and (ii) (n+1) residues of one or more non-aromatic diisocyanates, joined to said polyetherglycol residues by intervening carbamate groups, n ranging from 1 to about 4 and having an average value of from abut 1.5 to about 1, and (2) said hard segments being derivable from the reaction of a chain extender with the isocyanate end groups in said molecules and with one or more non-aromatic non-polymeric diisocyanates of a nature such that the resulting carbamate groups will be unable to associate with each other in such a manner as to result in domain crystallinity in the resulting polymer.

5. The optical fiber pressure sensing device of claim 4 wherein the ratio of glycol:diisocyanate:chain extender ranges from about 1:3:2 to about 1:15:14.

6. The optical fiber pressure sensing device of claim 5 wherein he polyurethane possesses a weight-average molecular-weight of between about 100,000 and about 200,000.

7. The optical fiber pressure sensing device of claim 6 wherein the polyurethane possesses a Shore hardness as measured by ASTM D2240-86 of between about A45 and about D80.

8. The optical fiber pressure sensing device of claim 7 wherein the clad possesses a refractive index which is at least 0.01 units less than the refractive index of the core.

9. The optical fiber pressure sensing device of claim 8 wherein the clad comprises polysiloxane.

10. The optical fiber pressure sensing evice of claim 9 wherein the optical fiber possesses an attenuation over the range of wavelengths of about 400 to 900 nanometers of less than about 30 decibels/meter.

11. The optical fiber pressure sensing device of claim 10 wherein the optical fiber possesses a maximum use temperature of about 60° C. or greater.

12. The optical fiber pressure sensing device of claim 11 wherein the optical fiber has a diameter between about 0.1 and about 2.0 millimeters.

13. The optical fiber pressure sensing device of claim 3 which additionally comprises (F) an informational handling system capable of recording the light intensity signal received from the light detector.

14. The optical fiber pressure sensing device of claim 13 wherein the informational handling system is comprised of a voltmeter, oscilloscope, strip chart recorder, or computer.

15. The optical fiber pressure sensing device of claim 13 which additionally comprises a means for focussing the light from the light source through the optical fiber.

16. The optical fiber pressure sensing device of claim 15 wherein the light source comprises a visible region tungston bulb, a light emitting diode, or a gaseous laser.

17. The optical fiber pressure sensing device of claim 16 wherein he light detector comprises a silicone PIN or other semiconducting diode or a photomultiplier tube.

18. The optical fiber pressure sensing device of claim 17 wherein the compression means comprises two hard parallel plates.

19. The optical fiber pressure sensing device of claim 18 capable of measuring pressures up to about 0.5 pounds/inch of fiber.

* * * * *